United States Patent [19]
Eiju et al.

[11] Patent Number: 5,335,058
[45] Date of Patent: Aug. 2, 1994

[54] TIME SERIES SIGNAL MULTICHANNEL FREQUENCY ANALYZER USING LIQUID CRYSTAL PANEL

[75] Inventors: Tomoaki Eiju; Kiyofumi Matsuda; Thomas H. Barnes; Shigeru Kokaji, all of Tsukuba, Japan

[73] Assignees: Agency of Industrial Science & Technology; Ministry of International Trade & Industry, Tokyo, Japan

[21] Appl. No.: 988,481

[22] Filed: Dec. 10, 1992

[30] Foreign Application Priority Data

Dec. 11, 1991 [JP] Japan .................................. 3-350892

[51] Int. Cl.⁵ .......................... G01P 3/36; G01R 19/00
[52] U.S. Cl. ................................ 356/28.5; 324/76.36
[58] Field of Search ................ 324/76.36; 340/765, 340/784, 795; 356/28.5

[56] References Cited

U.S. PATENT DOCUMENTS

| | | |
|---|---|---|
| 4,456,877 | 6/1984 | Brown . |
| 4,634,230 | 1/1987 | Spezio .................................. 342/54 |
| 4,919,536 | 4/1990 | Komine .............................. 356/28.5 |

*Primary Examiner*—Stephen C. Buczinski
*Attorney, Agent, or Firm*—Oblon, Spivak, McClelland, Maier & Neustadt

[57] ABSTRACT

A time series signal multichannel frequency analyzer comprises a Fourier transform lens, a liquid crystal panel disposed at the front focal plane of the Fourier transform lens, means for inputting a time signal from a different signal source to each scanning line of the liquid crystal panel, observation means disposed at the rear focal plane of the Fourier transform lens, and a cylindrical lens disposed between the Fourier transform lens and an observation plane of the observation means.

4 Claims, 4 Drawing Sheets

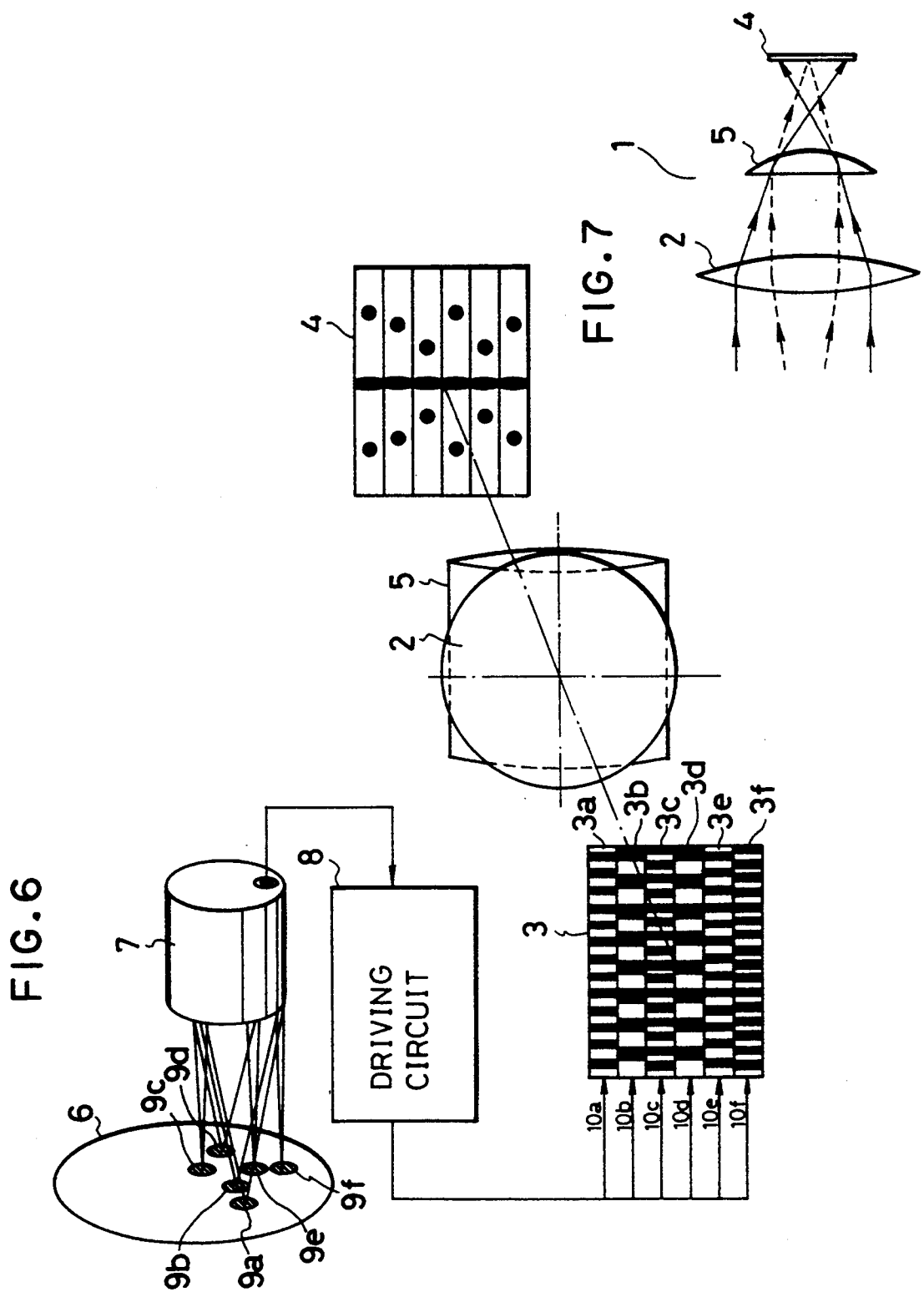

TIME SERIES SIGNAL MULTICHANNEL FREQUENCY ANALYZER USING LIQUID CRYSTAL PANEL

BACKGROUND OF THE INVENTION

1. Field of the Invention

This invention relates to a time series signal multichannel frequency analyzer using a liquid crystal panel.

2. Prior Art Statement

In the laser-Doppler velocity measurement method (LDV), the velocity of a moving body is determined from the change occurring in the frequency of a laser beam reflected off the body owing to the Doppler effect. LDV thus requires analysis of the frequency distribution of the reflected laser beam. LDV is also used for determining the center of rotation of rotating bodies. In this case, to determine the center with high-precision, it is necessary to measure the velocity of a number of points on the rotating body simultaneously and then to analyze the frequencies of the velocity signals obtained. The conventional method of conducting this analysis by computation using electric circuitry requires much time for the computations, so that it is impossible to achieve high-speed analysis.

One way of speeding up the frequency analysis is to subject the time series signals obtained by LDV to optical Fourier-transformation after writing them directly to an optical element. An optical time series signal Fourier transformation method using an acoustooptical device has been devised for this.

Since multichannel frequency analysis is difficult to achieve by this optical Fourier transformation method, however, the method cannot be practically applied in cases where there are a large number of signal sources, for example, where several tens of channel signals have to be simultaneously processed,

SUMMARY OF THE INVENTION

This invention was accomplished in the light of the foregoing circumstances and has as its object to provide a time series signal multichannel frequency analyzer using a liquid crystal panel, which is capable of two-dimensionally arraying time series signals and enables high-speed, simultaneous, multichannel optical Fourier transformation.

For achieving this object, the invention provides a time series signal multichannel frequency analyzer comprising a Fourier transform lens, a liquid crystal panel disposed at the front focal plane of the Fourier transform lens, means for inputting a time series signal from a different signal source to each scanning line of the liquid crystal panel, observation means disposed at the rear focal plane of the Fourier transform lens, and a cylindrical lens disposed between the Fourier transform lens and an observation plane of the observation means.

When a time series signal from a different signal source is written to each scanning line of the liquid crystal panel and the liquid crystal panel is then illuminated from the rear by a parallel light beam, a beam carrying the information written on the liquid crystal panel passes through the Fourier transform lens and the cylindrical lens to focus on the observation plane positioned at the rear focal plane of the Fourier-transform lens imagewise information in which only the pattern components parallel to the scanning lines are Fourier-transformed and the pattern components perpendicular to the scanning lines is not Fourier-transformed. In the image on the observation plane, a light spot appears for each frequency and the distance from the center of the observation plane to the light spot is proportional to the frequency of the signal written to the liquid crystal panel. Therefore, the magnitude of the frequency can be found by measuring this distance.

Thus, owing to its use of the cylindrical lens, the invention is able to optically Fourier-transform a large number of time series signals from different signal sources simultaneously.

The above and other features of the present invention will become apparent from the following description made with reference to the drawings.

BRIEF DESCRIPTION OF THE DRAWINGS

FIG. 6 is an explanatory view showing a plurality of time series signals which are Fourier-transformed by the analyzer according to the invention.

FIG. 7 is a front view showing the principal part of the analyzer according to the invention using a lens with a D-shaped section as a cylindrical lens.

DESCRIPTION OF THE PREFERRED EMBODIMENT

Figure 1:
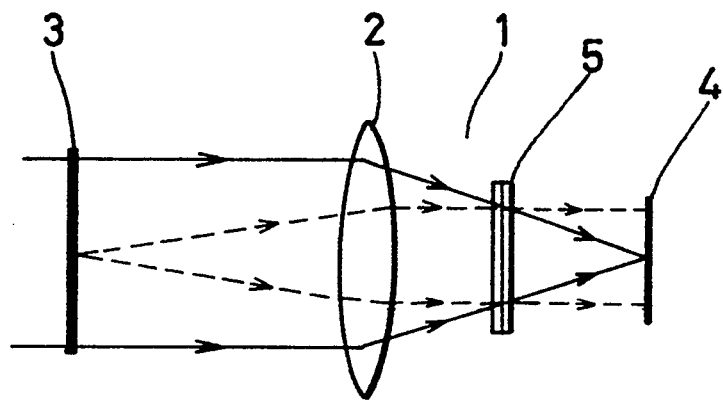
FIG. 1 is a plan view showing the basic configuration of a time series signal multichannel frequency analyzer according to the invention.
Figure 2:
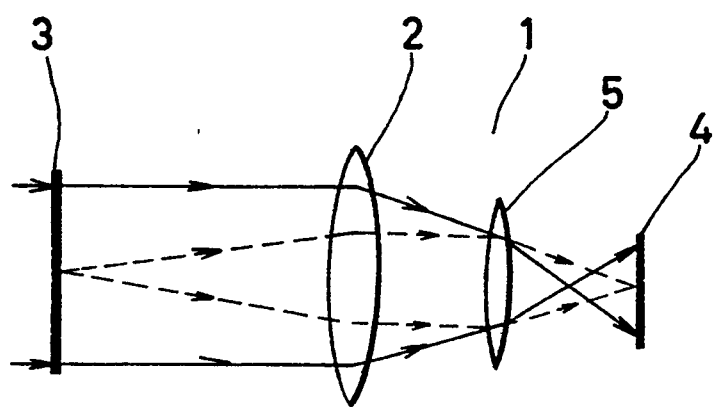
FIG. 2 is a front view of the analyzer of FIG. 1.

FIGS. 1 and 2 illustrate the basic configuration of a time series signal multichannel frequency analyzer according to the invention. The frequency analyzer, designated by the reference numeral 1, comprises a Fourier transform lens 2, a liquid crystal panel 3 disposed at the front focal plane of the Fourier transform lens 2, an observation plane 4 disposed at the rear focal plane of the Fourier transform lens 2, and a cylindrical lens 5 disposed between the Fourier transform lens 2 and the observation plane 4.

The liquid crystal panel 3 may have a large number of electrodes each corresponding to a picture element to be displayed and in which the modulation factor of the individual picture elements is controlled by supplying electric signals to the electrodes. A commercially available liquid crystal panel can be modified for use in the analyzer according to this invention by removing the illuminating light source and diffusion plate from the back of the panel, so as to enable a laser beam directed onto the panel from behind to be directly transmitted therethrough. The drive circuit used in a TV set with a liquid crystal display can be used as the circuit for writing data to the liquid crystal panel, provided that time series signals equivalent to TV picture signals are used.

In the illustrated embodiment, the cylindrical lens 5 positioned between the Fourier transform lens 2 and the observation plane 4 appears to be a plane parallel plate in plan view (Fig- 1) but appears to be a convex lens with an 0-shaped section when viewed from the side (FIG. 2). As a result, of the pattern information carried by the light passing through the liquid panel 3 and the Fourier transform lens 2, only the horizontal pattern component is Fourier-transformed at the observation plane 4 and the vertical pattern component is focused on the liquid crystal panel positioned at the input plane. The lens positioned between the Fourier transform lens 2 and the observation plane 4 only has to be able to Fourier-transform the pattern in one direction as described above. It is therefore not limited to an O-shaped cylindrical lens but can instead be a lens 5 with a D-shaped section as shown in FIG. 7.

Time series signals from different signal sources are assigned to the individual scanning lines of the liquid crystal panel 3. To be specific, as shown in FIG. 6, time series signals 10a, 10b, 10c, 10d, 10e and 10f are obtained from measurement points 9a, 9b, 9c, 9d, 9e and 9f of an object 6 to be measured using an LDV optical system 7 and are assigned to individual scanning lines 3a, 3b, 3c, 3d, 3e and 3f, respectively, of the liquid crystal 3 using a driving circuit 8. The liquid crystal panel serves as the input plane of the Fourier transform lens for Fourier-transforming the data input to the panel.

The liquid crystal panel is controlled by video signals and, by superimposing various signals, it is possible to obtain their Fourier-transforms. At this time the cylindrical lens positioned behind the Fourier transform lens 2 Fourier-transforms only the pattern component parallel to the scanning lines and focuses the vertical pattern component perpendicular to the scanning lines on the observation plane, as it is, in the form of the information on the liquid crystal panel. Thus the signals written to the scanning lines are independently Fourier-transformed.

The analysis processing conducted by the frequency analyzer of the foregoing structure will now be explained.

In the case where the optical data processing is directed to obtaining the two-dimensional frequency distribution of an input image, an input image is formed at the front focal plane of the Fourier transform lens and illuminated with a parallel beam to obtain the Fourier transform at the rear focal plane. The principle involved here is that a configuration having a fixed period at the input surface is diffracted in a fixed direction and rays traveling in the same direction are superimposed at a single spot on the focal plane of the lens.

By use of the drive circuit, the scanning lines of the liquid crystal panel 3 disposed at the front focal point of the Fourier transform lens 2 for image input are assigned and input with time series signals from a plurality of different signal sources.

The liquid panel 3 is constituted so as to retain the charge of the picture elements up to the next time they are scanned. Since laser-Doppler signals are time series signals, they can be Fourier-transformed optically by using them as the write signals for the liquid crystal panel.

When time series signals from different signal sources are written to the scanning lines of the liquid crystal panel 3 in the foregoing manner and the panel is then illuminated from behind by a parallel beam, light rays carrying the information written to the liquid crystal panel 3 pass through the Fourier transform lens 2 into the cylindrical lens 5. Since, as mentioned earlier, the cylindrical lens 5 has the shape of a plane parallel plate when viewed from above and the shape of a convex lens when seen from the side, at the observation plane 4 positioned at the rear focal plane of the Fourier lens 2 only the pattern components parallel to the scanning lines are Fourier-transformed while the vertical pattern components perpendicular to the scanning lines are focused in the form of the information on the liquid crystal panel 3 without Fourier transformation. When time series signals are successively written to the liquid crystal panel 3, the Fourier-transforms of the pattern components parallel to the scanning line on the liquid crystal panel 3 are obtained continuously on the observation plane 4. If the frequency of a pattern component is low, a bright spot is formed near the center of the observation plane, and if it is high, a bright spot is formed at a point further from the center. The distance of the spots from the center is proportional to the frequency of the signals written to the liquid crystal panel. The frequencies can therefore be obtained by measuring these distances.

An analyzer according to FIGS. 1 and 2 was fabricated. A commercially available liquid crystal panel intended for use in a liquid crystal television set was placed at the front focal plane of a Fourier lens, after being removed of its illumination light source and light diffusion plate. The image sensor of a CCD (charged coupled device) camera was disposed at the rear focal plane of the Fourier transform lens as the observation surface and the position of the light spot was measured. A cylindrical lens having an 0-shaped section was positioned on the optical axis of the Fourier lens and the observation plane so as to focus on the liquid crystal panel surface.

Figure 3:
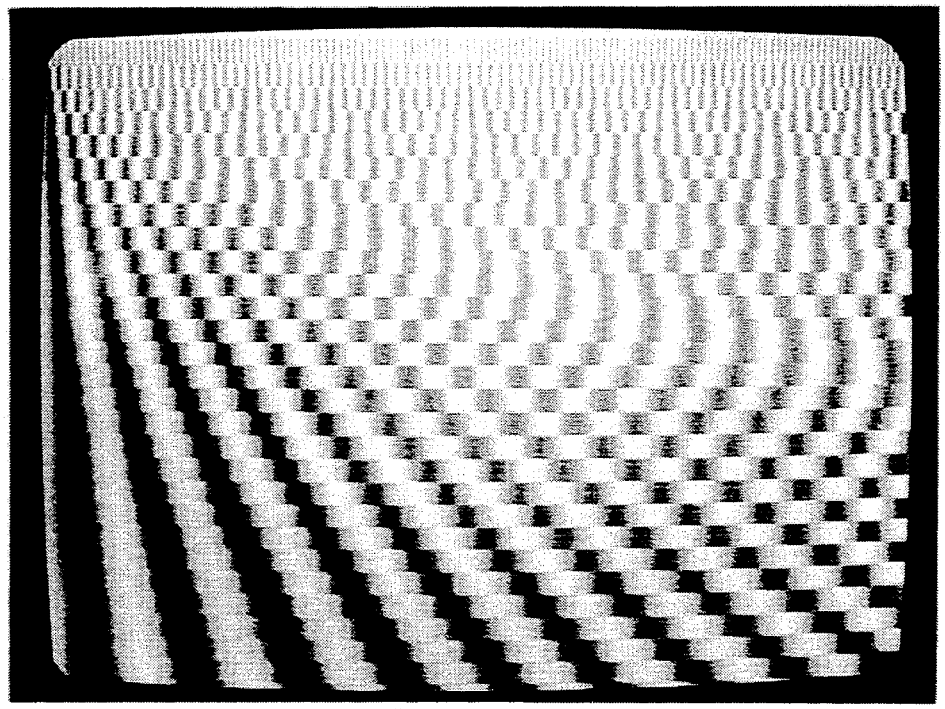
FIG. 3 is variable density test pattern used to test a time series signal multichannel frequency analyzer fabricated according to FIG. 1.

FIG. 3 shows an example input, which is a variable density pattern consisting of a large number of sine wave pattern components of differing frequency arranged vertically. This pattern was converted to a video signal in the frame memory of a computer and was then frequency analyzed by writing it to the liquid crystal panel.

Figure 4:
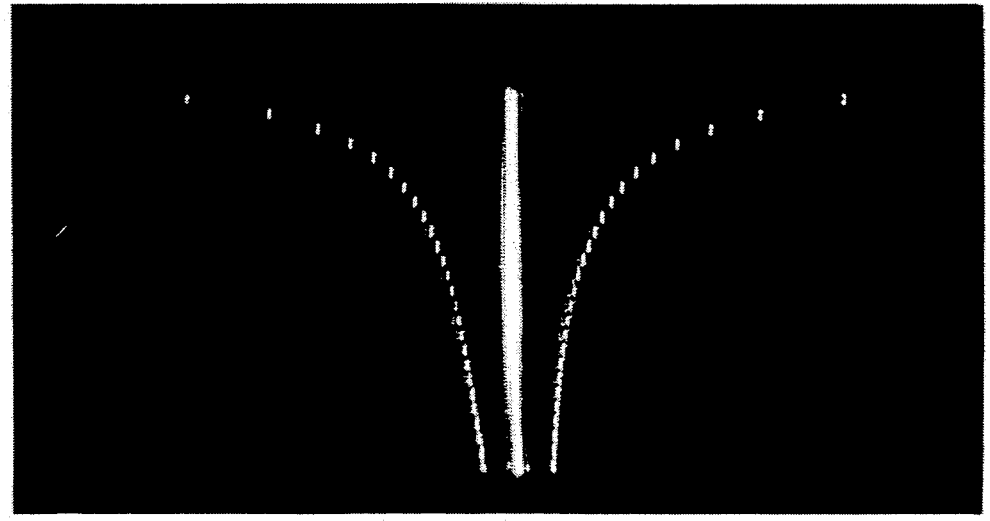
FIG. 4 shows the test pattern of FIG. 3 after Fourier-transformation by the analyzer of FIG. 1.

FIG. 4 shows the output pattern obtained at the image sensor when the pattern of FIG. 3 was input. The bright vertical line at the center represents zero order light corresponding to the direct current component. While it is not required for the measurement, its appearance cannot be avoided in a liquid crystal panel of the intensity modulated type. The bright spots on the left and right correspond to the frequency components and the distance between each and the zero order light represents the magnitude of the frequency. More specifically, the spots for patterns with long periods appear near the zero light, while those for patterns with short periods appear further away.

Figure 5:
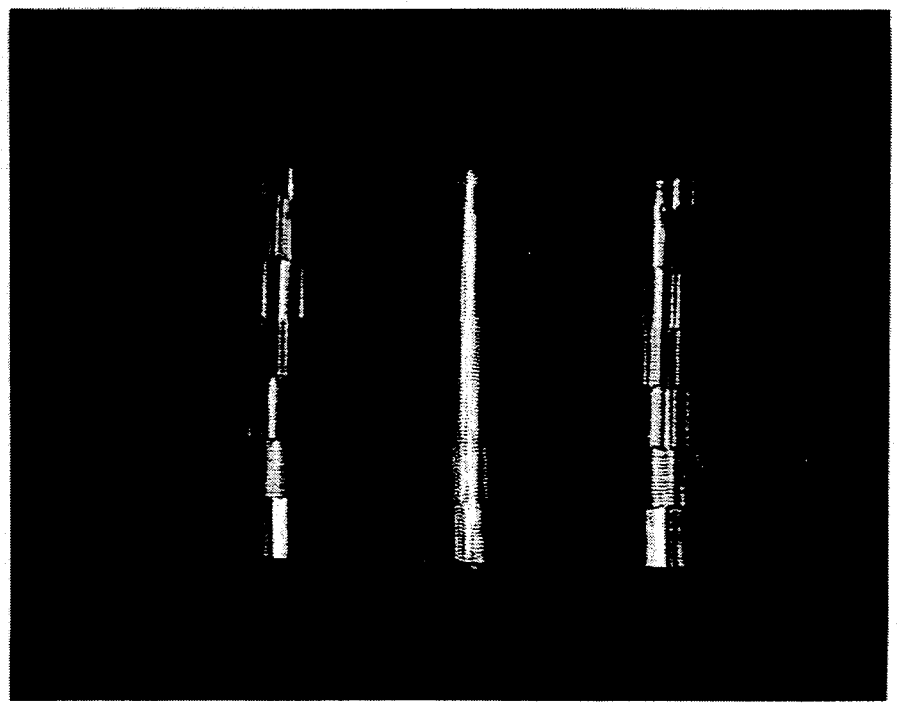
FIG. 5 shows the result of Fourier-transforming an LDV signal input from a frame memory.

FIG. 5 shows the output pattern when the LDV signal obtained by recording the pattern of FIG. 3 with a separate analyzer was input to the liquid crystal panel via a frame memory. The fact that light spot clusters formed at positions corresponding to the magnitude of the input signal frequency confirms that the signal was processed by optical Fourier transformation.

As is clear from the foregoing, although when an ordinary lens is used, not only the pattern component parallel to the scanning lines but also that perpendicular thereto are simultaneously Fourier-transformed, the use of a cylindrical lens in the frequency analyzer according to this invention makes possible independent and simultaneous optical Fourier transformation of laserDoppler signals from different signal sources that have been written to the scanning lines of the liquid crystal panel and, as such, enables the computation for analyzing a plurality of frequencies to be conducted at ultra-high speed.

What is claimed is:

1. A time series signal multichannel frequency analyzer using a liquid crystal panel, comprising a Fourier transform lens, a liquid crystal panel provided with scanning lines and disposed at a front focal plane of the Fourier transform lens, means for assigning time series signals from different signal sources to the individual lines of the liquid crystal panel, observation means disposed at a rear focal plane of the Fourier transform lens, and a cylindrical lens disposed between the Fourier transform lens and an observation plane of the observation means.

2. A multichannel frequency analyzer according to claim 1, wherein the cylindrical lens is positioned so as to focus an output from the Fourier transform lens on the panel surface.

3. A multichannel frequency analyzer according to claim 1, wherein the cylindrical lens has a D-shaped section.

4. A multichannel frequency analyzer according to claim 1, wherein the cylindrical lens has an O-shaped section.

* * * * *